C. G. SWEBILIUS & H. T. R. HANITZ.
TAKE-DOWN REPEATING FIREARM.
APPLICATION FILED MAY 11, 1914.
1,110,837.
Patented Sept. 15, 1914.
4 SHEETS—SHEET 2.
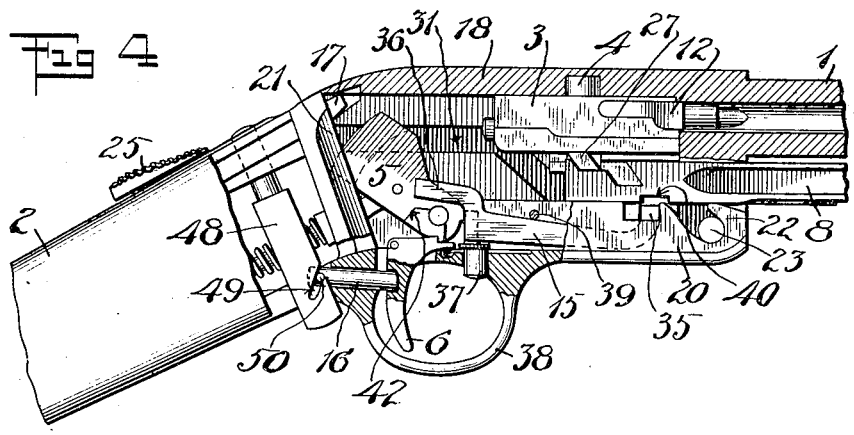
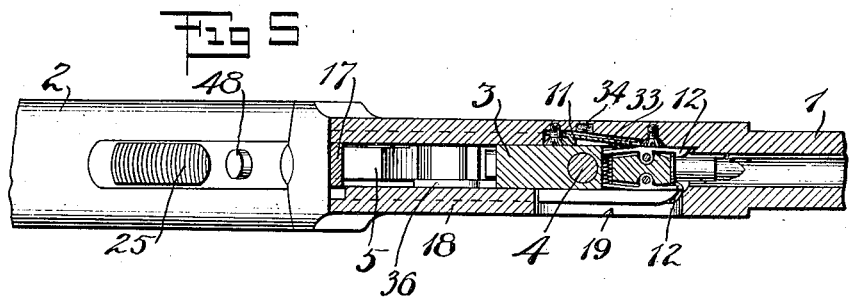
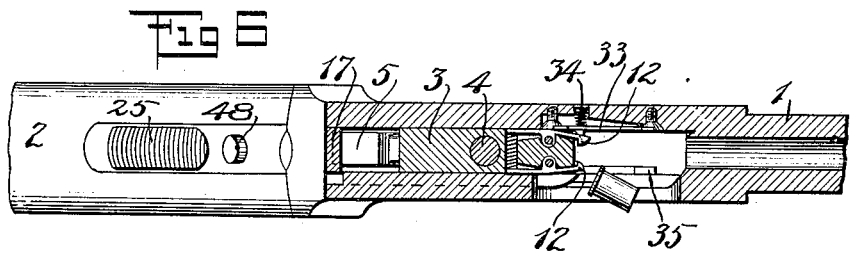
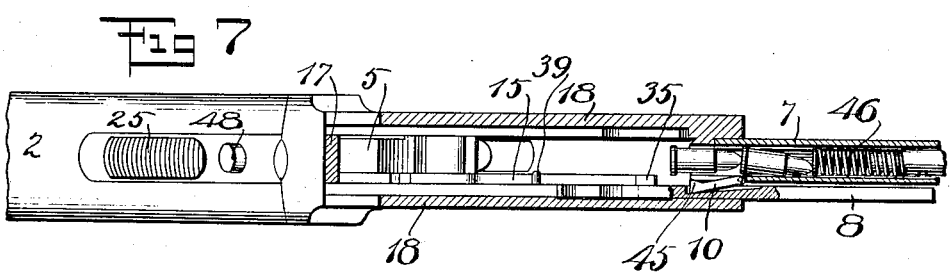
Witnesses:
C. J. Hachenberg
R. G. Mitchell
Inventors
Carl G. Swebilius
Hans T. R. Hanitz
By their Attorneys C. G. SWEBILIUS & H. T. R. HANITZ.
TAKE-DOWN REPEATING FIREARM.
APPLICATION FILED MAY 11, 1914.
1,110,837.
Patented Sept. 15, 1914.
4 SHEETS—SHEET 3.
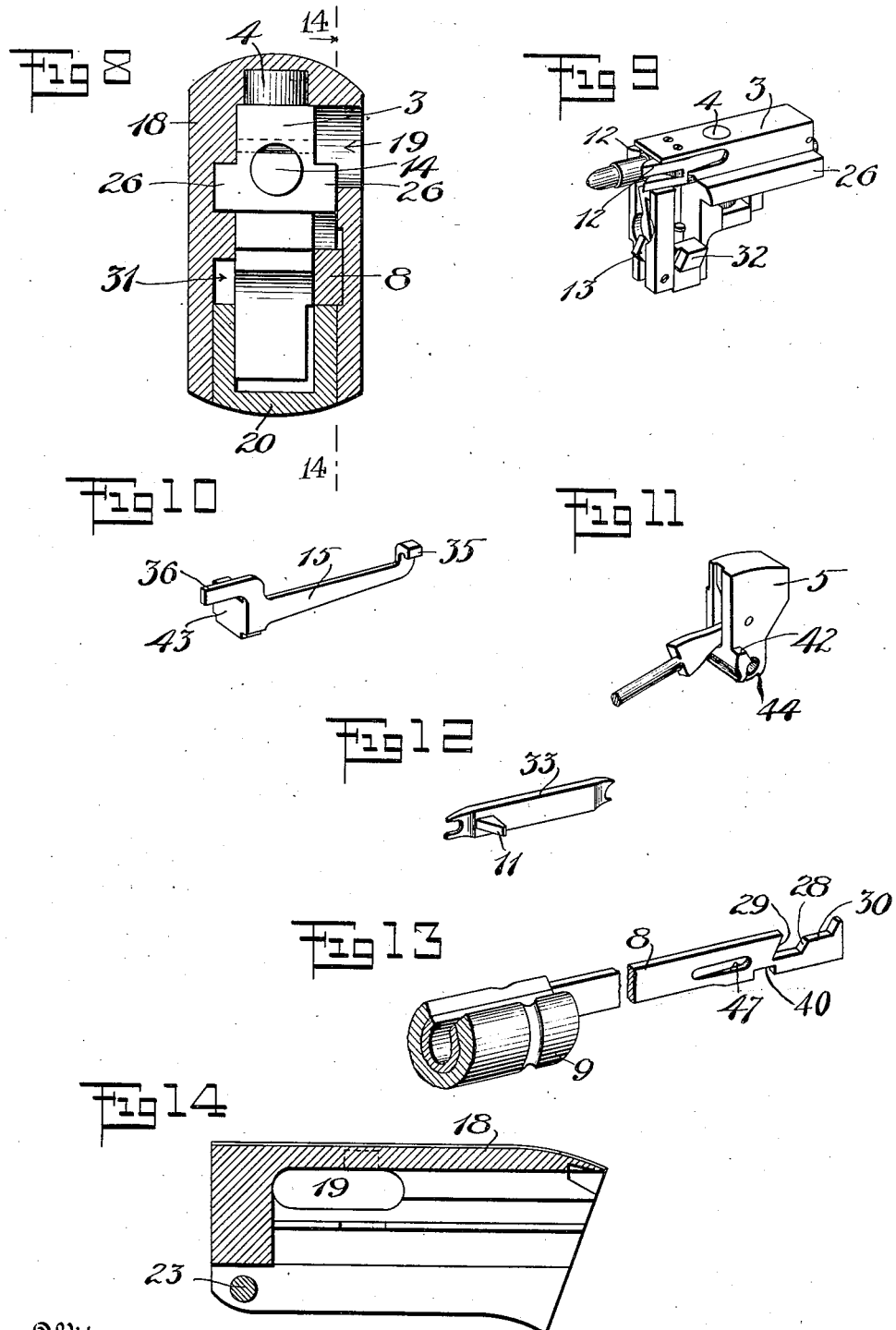
Witnesses:
C. J. Hachenberg
R. G. Mitchell
Inventors
Carl G. Swebilius
Hans T. R. Hanitz
by their Attorneys C. G. SWEBILIUS & H. T. R. HANITZ.
TAKE-DOWN REPEATING FIREARM.
APPLICATION FILED MAY 11, 1914.
1,110,837.
Patented Sept. 15, 1914.
4 SHEETS—SHEET 4.
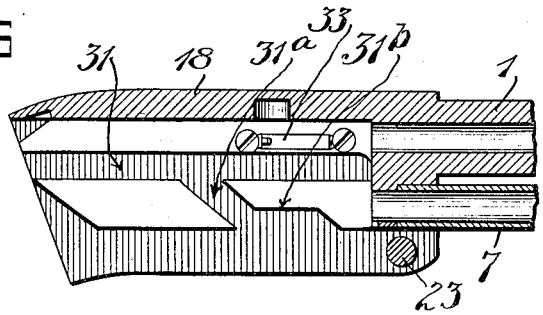
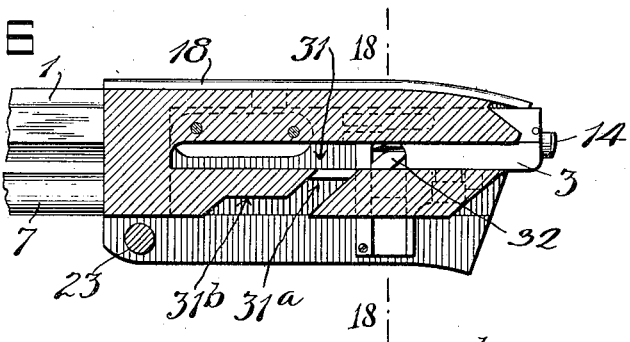
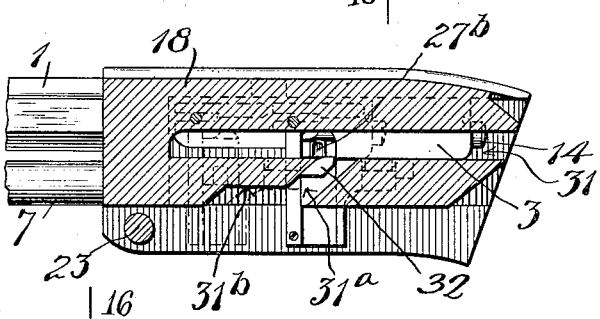
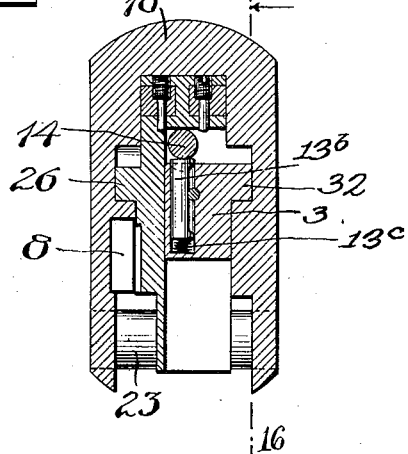
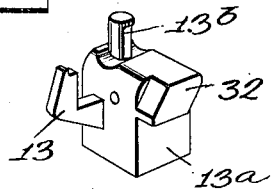
Witnesses:
Inventors
Carl G. Swebilius
Hans T. R. Hanitz
By their Attorneys

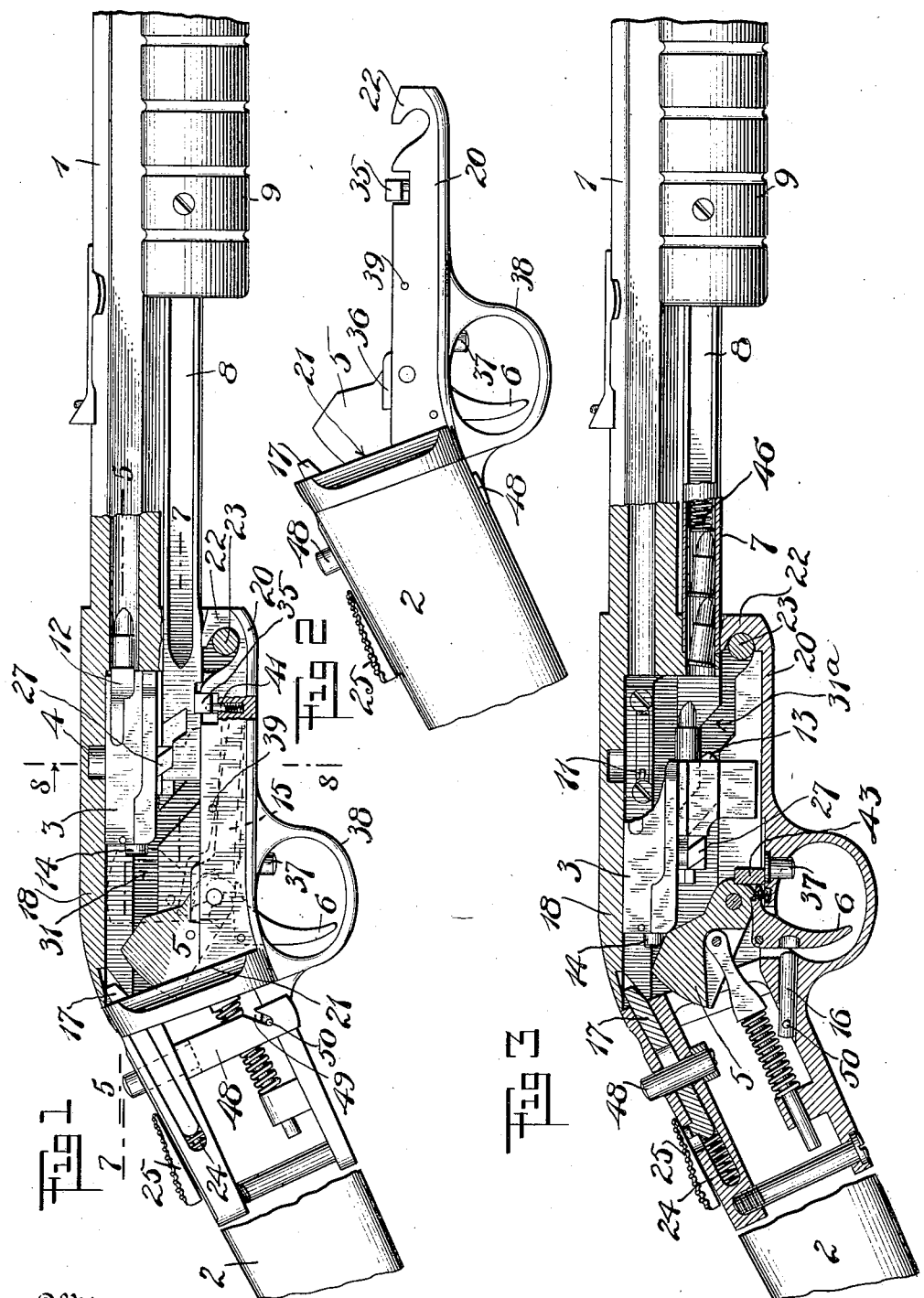

UNITED STATES PATENT OFFICE.

CARL G. SWEBILIUS AND HANS THEODOR RICHARD HANITZ, OF NEW HAVEN, CONNECTICUT, ASSIGNORS TO THE MARLIN FIREARMS COMPANY, OF NEW HAVEN, CONNECTICUT, A CORPORATION OF CONNECTICUT.

TAKE-DOWN REPEATING FIREARM.

1,110,837.  Specification of Letters Patent.  Patented Sept. 15, 1914.

Application filed May 11, 1914. Serial No. 837,698.

*To all whom it may concern:*

Be it known that we, CARL G. SWEBILIUS and HANS T. R. HANITZ, a citizen of the United States, and a subject of the Emperor of Germany, respectively, residing at New Haven, county of New Haven, State of Connecticut, have invented certain new and useful Improvements in Take-Down Repeating Firearms, of which the following is a full, clear, and exact description.

Our invention relates to firearms and consists in many new and useful improved features of construction, as hereinafter pointed out.

The main objects of the invention include a novel take-down construction whereby the barrel portion and stock portion may be separated for convenience in packing and transportation; a novel combination and grouping of breech elements; a novel cut-off construction for controlling the feeding of cartridges from the magazine into the receiver, and novel safety means. Other novel features will be apparent from a reading of the following specification and an examination of the accompanying drawings which illustrate the invention in a preferred form.

In the accompanying drawings, Figure 1 is a side elevation, certain parts being broken away, and other parts being shown in vertical longitudinal section. Fig. 2 is a detail view illustrating part of the take-down construction and showing the forward end of the stock portion. Fig. 3 is a side elevation, partly in vertical longitudinal section, said view being generally similar to Fig. 1 but showing the parts in a different position. Fig. 4 is a view, generally similar to Fig. 1, showing certain parts in a different position. Fig. 5 is a horizontal longitudinal sectional view on the plane of the line 5—5 of Fig. 1. Fig. 6 is a similar view showing the parts in a different position. Fig. 7 is a sectional view on the line 7—7 of Fig. 1. Fig. 8 is a relatively enlarged cross sectional view on the line 8—8 of Fig. 1. Fig. 9 is a perspective view of the breech block and associated parts, detached. Figs. 10, 11, 12 and 13 are perspective views of other details. Fig. 14 is a section on the plane of the line 14—14, Fig. 8. Fig. 15 is an inside view partly in section of the receiver showing the left-hand side plate. Fig. 16 is a longitudinal section through the receiver on the plane of the line 16—16 of Fig. 18. Fig. 17 is a similar view showing certain parts in a different position. Fig. 18 is a relatively enlarged cross-section of the receiver and breech mechanism on the plane of the line 18—18 of Fig. 16. Fig. 19 is a relatively enlarged perspective view of the carrier.

The main parts of the firearm are as follows:

1 represents the barrel.
2 is the stock.
3 is the main body of the breech block.
4 is the locking bolt.
5 is the hammer.
6 is the trigger.
7 is the magazine.
8 is the action rod.
9 is the action rod handle which reciprocates underneath the barrel.
10 is the cut-off.
11 is the ejector.
12—12 are the extractor hooks.
13 is the carrier.
14 is the firing pin.
15 is the safety device.
16 is the trigger lock.
17 is the bolt for detachably connecting the stock portion to the barrel portion.
18 is the receiver in which the various parts of the breech mechanism are contained. The receiver 18 is rigidly attached to the barrel 1 and includes the solid top plate and two side plates spaced apart appropriately, one of said side plates having the side ejector opening 19.
20 is a tang which is rigidly carried by the stock portion 2 (see Fig. 2) and which likewise carries the hammer 5, trigger 6 and safety sear 15.
21 is an inclined abutment, or reinforce, at the rear end of the tang 20 suitably designed to engage the rear end of the receiver when the parts are assembled.

Having thus outlined the main parts of the entire mechanism, we will now proceed to describe how said parts are arranged and coöperate, at the same time calling attention to certain new and improved features of construction.

*Take-down.*—The take-down construction involves a suitable detachable splice between the barrel portion and the stock portion, and this splice is effected in its preferable form in such a way that the parts may be very quickly separated. In the drawings, the tang 20 on the stock portion is provided with a hooked extension 22 which is arranged to engage with a suitable holding shoulder or abutment, such as a pin 23 arranged at the forward end of the receiver and underneath the reinforce of the barrel 1 (see Figs. 1, 2 and 4). The tang 20 fits snugly between the side plates of the receiver 18 so that when the parts are assembled, the only opening into the receiver is the side ejector opening 19 (see Fig. 8). The reinforce 21 at the rear of the tang 20 is so spaced relatively to the hooked end 22 that when the parts are assembled it will wedge against the rear end of the receiver 18, in which position the latch bolt 17 will interlock with the receiver in a suitable recess at the rear thereof so that the takedown parts may be rigidly united for service. The latch bolt 17 is preferably spring pressed into the locking position, as by a spring 24, and is likewise provided with an exposed finger piece 25 so that the bolt 17 may be withdrawn when it is desired to take down the gun. The bolt 17 is preferably concealed within the reinforce of the stock portion. The nose of the bolt is preferably formed so as to produce a cam or wedging shoulder to take up wear.

*Breech mechanism.*—The breech block is mounted to have a reciprocating movement within the receiver, being suitably guided at the opposite sides thereof by lugs 26—26 (Fig. 8) running in guide-ways in the side walls of the receiver, said guide-ways being extended entirely back to the rear end thereof so that the breech block may be readily inserted or removed. Associated with the breech block is the locking bolt 4, the upper end of which is arranged to project into a recess in the top of the receiver when the gun is loaded ready for firing (see Figs. 1 and 4). This locking bolt is actuated by the action rod 8, the rear end of which projects into the receiver and is provided with cam inclines arranged to engage a lug 27 on the locking bolt 4, the sides of which may be correspondingly inclined to avoid wear. The incline for lifting the locking bolt into its locking position is indicated at 28, while the incline for withdrawing the locking bolt is indicated at 29 (Fig. 13). When the bolt is forced into place, the action rod may move ahead slightly so as to bring the lug 27 onto the horizontal edge 30 of the action rod, thus holding the locking bolt in the locking position. The breech block likewise carries the carrier 13. The vertical front end of the breech block is provided with a guide-way for the rim of the cartridge so that when the cartridge is lifted by the carrier 13, it will be properly guided up to a position where it will be engaged by the extractor hooks 12—12. The carrier is moved by means of a cam groove 31 in the side wall of the receiver, into which cam groove a lug 32 on the body of the carrier 13 projects. The cam groove 31ª is so designed that when the breech block is in its forward position, the carrier will be lowered so that a cartridge from the magazine may be moved into position with its rim within the guide-way of the breech block and above the nose of the carrier. As soon as the breech block is retracted, the carrier will commence to ascend under the action of the cam groove on the lug 32, thus lifting the cartridge into engagement with the extractor hooks. On the forward movement of the breech block the carrier will descend to its original position, the cartridge remaining in the grasp of the extractor hooks, as shown in Fig. 9. When the breech block is again retracted, the rim of the cartridge will engage the ejector 11 and be thereby tripped and discharged through the side opening 19. The ejector comprises a nose 11 mounted upon a yielding bar support 33 which is spring supported, as by a spring 34, so that it may be repressd when the breech block is advanced. The extractor hook 12 on the side adjacent the ejector is provided with a clearance passage for the ejector 11, said clearance passage being shown in Fig. 9.

As will be seen by reference to Fig. 8, the tang 20 is channeled so as to provide a bottom piece and two side pieces. In the channel is pivotally mounted the hammer 5 and likewise the trigger 6. Located in the channel is the safety lever or sear 15. The forward end of this safety lever 15 is provided with a laterally extending nose 35 which is located in a recess in the side wall of the tang, said recess being slightly longer than the width of the nose so that the sear 15 may have a limited longitudinal sliding movement. The rear end of the sear 15 is provided with a tail or extension 36 which extends over the hub of the hammer, said rear end of the sear being supported on a finger piece 37, the lower end of which projects downwardly and preferably slightly into the trigger guard 38. 39 is a pivot pin carried by the side walls of the tang extending above the sear intermediate its ends so that it will act as a fulcrum whereby when the rear end of the sear is elevated, the forward end will be depressed. The action rod 8 is provided with a notch 40 in its lower edge of slightly greater length than the width of the nose 35 on the sear 15. 41 is a spring pressed plunger, or equivalent device, for normally pressing the forward end of the sear upwardly so that the nose 35 will press against the under side of the action rod 8 and project into the notch 40 when the action rod assumes approximately the position shown in Fig. 1. The nose may be removed from the action rod notch 40 by pressing up on the member 37, as shown in Fig. 4, the said sear 15 tilting on the fulcrum pin 39. By this means the action rod may be manually released when it is desired to retract the breech block when the hammer is cocked. The hub of the hammer 5 is provided with a shoulder 42 which, when the hammer descends, rises and engages the tail 36 of the sear, thereby tilting the same to withdraw the nose 35 from the action rod. The safety sear is provided with a lateral offset 43 which is arranged to engage in a notch 44 in the hub of the hammer 5 when the hammer is overcocked, as by the retraction of the breech block, thus guaranteeing that the hammer will not descend on the forward excursion of the breech block during the holding of the gun. When, however, the breech block has reached its forward position and the locking bolt 4 has been elevated to lock the breech block, the notch 40 in the action rod stands over the nose 35 on the sear 15 so that the nose will project into the notch whereby the last part of the forward movement of the rod 8 will cause the sear to be drawn ahead from the hammer locking position shown in Fig. 3 to that shown in Fig. 1, this forward movement of the sear releasing the hammer and allowing it to drop from its overcocked position to its cocked position, where it is engaged by the trigger 6, as shown in Fig. 4. Assuming that a cartridge has, by this operation of the breech block, entered into the chamber of the barrel and that the gun is locked up (the locking up being incidental to the releasing of the hammer from the overcocked position), the trigger may now be pulled and the hammer released to discharge the cartridge in the customary manner.

*Cartridge stop.*—The cartridge stop, or cut-off, is unique in several particulars and comprises simply the member 10 pivoted at its front end to the magazine, the rear end of the stop 10 being provided with a nose 45 which, when the stop is pressed in, blocks the rearward passage of the cartridges in the magazine, the latter being pressed rearwardly by the usual follower spring 46. The nose 45 is inclined at its forward edge so that the moment pressure is released at the back of the stop 10, the pressure of the follower spring 46 will force the cartridges in the magazine rearwardly to allow the rearmost one to escape past the cut-off or stop. At the inner side of the action rod 8 is a notch 47 (see Fig. 13), the bottom of which is preferably inclined and is of a size sufficient to permit the stop 10 to be repressed by the adjacent cartridge when the action rod is advanced, the pressure of the follower spring against the cartridge in the magazine causing the rim of the rearmost cartridge to press against the incline of the stop in such a way as to force the stop back into the recess, as shown in Fig. 7. At this time the breech block and associated parts stand in the forward part of the receiver, and hence, although the column of cartridges in the magazine may be released by the stop 10, nevertheless only the rearmost cartridge can escape since it abuts against the breech block. As soon as the action rod is retracted carrying back the breech block, the rearmost cartridge follows the breech block and simultaneously the incline at the bottom of the groove 47 presses the stop 10 inwardly so that when the rearmost cartridge has become free from the magazine, the nose of the stop 10 will stand in position to engage and hold the cartridge, or column of cartridges, in the magazine against escape until the action rod has again been advanced, whereupon one more cartridge is released as before. By this very simple arrangement no spring is required for the cut-off, the pressure of the follower spring 46 against the cartridge or cartridges in the magazine being utilized to repress the cut-off when the aforesaid notch or groove 47 is located in the position shown in Fig. 7.

*Trigger safety.*—The trigger safety comprises a bolt 16 which is mounted to slide in the stock reinforce, as shown in Figs. 3 and 4, being capable of being projected toward and away from the rear side of the trigger 6. This bolt 16 is moved by a slide 48, the upper and lower ends of which project through the upper and lower tangs which extend rearwardly from the stock reinforce. The slide 48 has a cam groove 49 therein, while the bolt 16 may have a pin 50 projecting into said cam groove 49. When the slide is moved up, as shown in Fig. 1, the bolt 16 is drawn rearwardly so as to free the trigger 6. When, however, the slide is moved down, as shown in Fig. 4, the bolt 16 is projected so as to block the trigger 6 against movement. The slide 48 is positively moved in both directions since both ends can be readily engaged by the fingers of the user to be depressed from above or elevated from below, thus guaranteeing the certain action of the trigger safety bolt 16. By preference the rear side of the trigger is provided with a slight concavity arranged to receive the nose of the bolt 16 when the trigger is to be locked, as shown in Fig. 4. By forming the tang 20 in the manner shown, that is to say, with the longitudinal channel in its upper side, the weight of the same is substantially reduced and at the same time a space is afforded for receiving the hammer and associated parts between the side walls of the channel.

In Figs. 15 to 19 we have illustrated such parts as are necessary to show the operation of the carrier. 13ᵃ is the main body of the carrier at the side of which is the lug 32, which is preferably rigid. In the top of the carrier is a plunger 13ᵇ, which is pressed upwardly by a spring 13ᶜ. When the carrier is lifted, this plunger is depressed by engagement with some over-lying part, for example, in this particular instance the firing pin 14, so that it will put a slight downward strain on said carrier. 31ᵃ is a forward and downwardly inclined groove in the side wall of the receiver, directly below the horizontal guide groove 31 and communicating therewith. It will be understood that the lug 32 on the carrier moves to and fro in that part of the horizontal guide groove 31 to the rear of the diagonal passage 31ᵃ, but when, on the forward movement of the carrier, the lug 32 reaches the diagonal passage 31ᵃ, the pressure of the plunger 13ᵇ will cause the carrier to descend, the lug 32 passing obliquely down through the slot or passage 31ᵃ. As soon as it has cleared the passage, the carrier will continue forwardly under the overlying shoulder 31ᵇ. On the rearward movement of the breech mechanism, the lug 32 will encounter the inclined rear wall of the passage 31ᵃ and will be raised so as to lift the carrier to the position where a cartridge carried thereby will be moved into engagement with the extractor hooks 12—12. This simple method of controlling the operation of the carrier is an improvement on our construction as set forth in our former Letters Patent 1,090,351 and constitutes a simpler and more positive means for effecting the operation of the carrier than disclosed in said former construction. In the present case, as will be seen, the groove which controls the travel of the carrier is, in effect, stepped, the step-up being along an incline path located between the two extremes of travel forward and backward of the said carrier. The groove is likewise, in effect, a single groove which may be of uniform depth throughout as distinguished from a double groove which must be of different depths throughout as shown in our former patent. It will furthermore be observed inasmuch as part of the guide groove for the breech block is utilized as part of the stepped groove for the carrier that the cost of providing a special carrier groove wholly separate from the breech block guide groove is avoided.

What we claim is:

1. In a take-down repeating firearm, a barrel portion, a stock portion, a separable receiver comprising one part including a top plate and two depending side plates rigidly connected with the barrel, the other part comprising a tang arranged to be located between the two side plates of the first mentioned part, said tang being rigidly connected with the stock, a separable hinge for operatively connecting the two receiver parts at one end of the receiver, and a bolt for operatively connecting said parts at the other end of the receiver.

2. In a take-down repeating firearm, a barrel, a stock, a separable receiver comprising one part including a top plate and two depending side plates rigidly connected with the barrel, the other part comprising a tang arranged to be located between the two side plates of the first mentioned part, said tang being rigidly connected with the stock, a hook at the forward end of the tang and an abutment carried by the other part of the receiver for receiving and holding said hook, a wedge connection between the rear end of the first mentioned part of the receiver and the adjacent end of the tang and arranged to hold said two parts of the receiver in assembled position, and a bolt adjacent said wedge connection and assisting in holding said parts in operative relation.

3. In a take-down repeating firearm, a barrel, a stock, a separable receiver comprising one part including a top plate and two depending side plates rigidly connected with the barrel, the other part comprising a tang arranged to be located between the two side plates of the first mentioned part, said tang being rigidly connected with the stock, a hook at the forward end of the tang and an abutment carried by the other part of the receiver for receiving and holding said hook, a wedge connection between the rear end of the first mentioned part of the receiver and the adjacent end of the tang and arranged to hold said two parts of the receiver in assembled position, and a spring latch bolt adjacent said wedge connection and assisting in holding said parts in operative relation.

4. In a take-down repeating firearm, a barrel, a stock, a separable receiver comprising one part including a top plate and two depending side plates rigidly connected with the barrel, the other part comprising a tang arranged to be located between the two side plates of the first mentioned part, said tang being rigidly connected with the stock, a hook at the forward end of the tang and an abutment carried by the other part of the receiver for receiving and holding said hook, a wedge connection between the rear end of the first mentioned part of the receiver and the adjacent end of the tang and arranged to hold said two parts of the receiver in assembled position, and a bolt carried by the stock portion adjacent said wedge connection and assisting in holding said parts in operative relation.

5. In a take-down repeating firearm, a barrel, a stock, a separable receiver including one part rigidly connected to the barrel and the other part rigidly connected to the stock, the barrel portion of the receiver including a top plate and two spaced side plates depending therefrom, a breech block, a locking bolt and cartridge carrier housed within the space between said plates, a guide connection between the breech block and the inside wall of the receiver, a tubular magazine underneath the barrel and entering the front of the receiver, a reciprocating action rod adjacent the magazine and likewise entering the front of said part of the receiver, a hammer, trigger and safety sear arranged to coöperate between the hammer and the action rod, said parts being carried by that part of the receiver rigidly connected to the stock, means for detachably connecting the two parts of the receiver at the front end and at the rear end thereof.

6. In a take-down repeating firearm, a barrel, a stock, a separable receiver including one part rigidly connected to the barrel and the other part rigidly connected to the stock, the barrel portion of the receiver including a top plate and two spaced side plates depending therefrom, a breech block, a locking bolt and cartridge carrier housed within the space between said plates, a guide connection between the breech block and the inside wall of the receiver, a tubular magazine underneath the barrel and entering the front of the receiver, a reciprocating action rod adjacent the magazine and likewise entering the front of said part of the receiver, a hammer, trigger and safety sear arranged to coöperate between the hammer and the action rod, said parts being carried by that part of the receiver rigidly connected to the stock, and means for detachably connecting the two parts of the receiver at the front end and at the rear end thereof, said detachable connecting means including a hinge connection at the front of the receiver, and a bolt connection at the rear of the receiver.

7. In a repeating firearm, a receiver, cartridge handling mechanism therein, a tubular magazine entering the front end of the receiver, part of said cartridge handling mechanism being movable to and fro within the receiver at the rear of said magazine, a cartridge stop comprising a member arranged to be pressed into an inclined position partly across the path of movement of the cartridges in the magazine to engage the rearmost cartridge, means within the magazine for pressing rearwardly one or more cartridges therein, a reciprocating action rod coöperating with said cartridge handling mechanism and with said stop to press said stop positively into the cartridge engaging position when said action rod is moved rearwardly, and to release its operative pressure on the stop when it is moved forwardly and when said cartridge handling mechanism stands close to the rear end of the magazine, whereby the rearmost cartridge in the magazine may repress said stop and move back against said cartridge handling mechanism.

8. In a repeating firearm, a receiver, reciprocating cartridge handling mechanism therein, a tubular magazine entering the front end of the receiver in line with part of said cartridge handling mechanism, a follower spring therein, a reciprocating action rod coöperating with said cartridge handling mechanism and movable in a line substantially parallel with the magazine, a cartridge stop loosely mounted adjacent to the action rod and arranged to be projected thereby into the magazine to stand obliquely in the path of the cartridges therein, means on the action rod for positively moving said stop into the cartridge engaging position when said action rod is in one position, and for releasing said stop when said action rod is in another position, whereby the pressure of the follower spring will repress said stop and free the rearmost cartridge.

9. A cartridge stop for a firearm having a tubular magazine comprising a swinging member carried by the magazine and having a part arranged to project into the magazine at a point forward of the rear end of said magazine, a follower spring in the magazine, a reciprocating action rod adjacent to and movable parallel with said magazine, said cartridge stop being operatively engaged and projected by said action rod when the latter is moved rearwardly slightly from its forward position, said action rod freeing said stop when said rod is in its forward position whereby said stop may be repressed by the action of the follower spring through the medium of the cartridge bearing against said stop.

10. In a repeating firearm, a hammer, a trigger, a trigger safety bolt, the forward end of said bolt being movable to and fro at the rear of the trigger to engage the latter when advanced, means for imparting positive longitudinal movement to said bolt comprising a slide arranged transversely to the bolt and having its upper and lower ends exposed above and below the grip portion of the gun, and a cam connection between said slide and said bolt for imparting both forward and rearward movement to the latter as the slide is reciprocated.

11. In a repeating firearm, a hammer, a trigger safety bolt, the forward end of said bolt being movable to and fro at the rear of the trigger to engage the latter when advanced, means for imparting positive longitudinal movement to said bolt comprising a slide arranged transversely to the bolt and having its upper and lower ends exposed above and below the grip portion of the gun, and a cam connection between said slide and said bolt for imparting both forward and rearward movement to the latter as the slide is reciprocated, and a recess in the rear side of the trigger arranged to receive the forward end of the safety bolt when the latter is advanced.

12. In a repeating firearm, a hammer, a trigger, a trigger guard, a trigger locking device comprising a manually operable bolt carried by said trigger guard, a recess in the rear side of the trigger arranged to receive the nose of the bolt with means for positively moving said bolt to project its nose into and to withdraw its nose from said recess, said bolt moving means being movable transversely of the line of movement of said bolt.

13. In a repeating firearm, a receiver, a breech block arranged to reciprocate to and fro in said receiver, a reciprocating action rod for moving said breech block, and cartridge handling mechanism carried by said breech block including a carrier, said carrier being movable across the path of movement of said breech block and arranged to interlock with the receiver, a stepped groove in the side of the receiver, the step in said groove being formed obliquely relatively to the rest of the groove, and a projection on the carrier extending into said groove and arranged to be moved up and down by engagement with the side walls of the step portion.

14. In a repeating firearm, a receiver, a reciprocating breech block, guide groove in the side of the receiver for said breech block, a carrier movably mounted in said breech block and arranged to move transversely thereof and interlock with part of the receiver when the breech block is in a certain position, a stepped guide groove, part of said breech block guide groove constituting part of the carrier guide groove.

CARL G. SWEBILIUS.
HANS THEODOR RICHARD HANITZ.

Witnesses:
FREDERICK R. STAUB,
JOHN F. MORAN.